(12) United States Patent
Lutzen et al.

(10) Patent No.: US 6,390,688 B1
(45) Date of Patent: May 21, 2002

(54) STRAIN RELIEF CONNECTOR FOR FIBER OPTIC CABLE AND METHOD OF MAKING SAME

(75) Inventors: Jon A. Lutzen, Manchester; Rudolph A. Montgelas, West Hartford; Alan C. Miller, Madison, all of CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/565,489

(22) Filed: May 5, 2000

(51) Int. Cl.[7] .................................................. G02B 6/36
(52) U.S. Cl. ........................................ 385/87; 174/84 C
(58) Field of Search .................. 385/87, 76; 174/84 C, 174/75 C, 78

(56) References Cited

U.S. PATENT DOCUMENTS

| | | | |
|---|---|---|---|
| 3,655,275 A | 4/1972 | Seagreaves | 385/53 |
| 4,738,504 A | 4/1988 | Jones | 385/86 |
| 5,140,662 A | 8/1992 | Kumar | 385/87 |
| 5,317,664 A | 5/1994 | Grabiec et al. | 385/87 |
| 5,418,874 A | 5/1995 | Carlisle et al. | 385/76 |
| 5,455,880 A | 10/1995 | Reid et al. | 385/87 |
| 6,302,594 B1 | 10/2001 | Lee | 385/87 |

*Primary Examiner*—Tulsidas Patel
(74) *Attorney, Agent, or Firm*—Jeffrey J. Howell; Mark S. Bicks; Alfred N. Goodman (57) ABSTRACT

A strain relief connector for a fiber optic cable has an optical fiber enclosed within a cover having an outer diameter. A relatively long sleeve surrounds the cover and has an inner surface at an inner diameter, the inner diameter being substantially larger than the outer diameter of the cover. Portions of the sleeve and the fiber optic cable are compressed by a die, forming compressed portions having widths substantially larger than their heights and causing the inner surface of the sleeve to frictionally engage the outer surface of the cover layer and the inner surface of the cover to fictionally engage the outer surface of the optical fiber enclosed therein. The length of the sleeve and the configuration of the compressed portion allow a relatively high area of frictional resistance between the buffer layer and the sleeve.

32 Claims, 6 Drawing Sheets

STRAIN RELIEF CONNECTOR FOR FIBER OPTIC CABLE AND METHOD OF MAKING SAME

FIELD OF THE INVENTION

The present invention relates to a non-adhesive strain relief connector for a fiber optic cable. More particularly, the present invention relates a fiber optic cable that is disposed with in a metal sleeve, with the cable and sleeve being simultaneously compressed forming a long flat crimp connector having a width that is substantially greater than its height. The combination of the length and the width results in a large frictional surface between the sleeve and the fiber optic cable providing a strong, reliable connection.

BACKGROUND OF THE INVENTION

Strain relief connectors for fiber optic cables are common in the connector industry. Conventional strain relief connectors have a sleeve surrounding a light transmitting optical fiber or a plurality of light transmitting optical fibers. The optical fibers are generally surrounded or covered and protected by a jacket or buffer material formed from a plastic. The sleeve and the fiber optic cable are then crimped using a crimping tool into a hexagonal or round shape.

Conventional crimping methods do not allow adequate lateral flow of the jacket material, in other words, the jacket material does not substantially flow in a direction perpendicular to the longitudinal axis of the crimp sleeve. A lack of lateral flow forces the buffer material to flow along the longitudinal axis of the crimp sleeve, producing longitudinal flow. Longitudinal flow places tension on the optical fiber, possibly causing damage to or failure of the optical fiber, or changing its optical characteristics.

In addition, conventional crimping methods have a crimp length that is short relative to the diameter of the jacket material. Generally, the length of the crimp is less than four times the buffer material diameter. This short length results in a small area of frictional contact between the inner surface of the crimp sleeve and the outer surface of the buffer material and may make failure of the connector more likely under tensile or thermal stress.

Examples of prior art fiber optic cable crimp connectors are disclosed in the following U.S. Pat. No. : 3,655,275 to Seagraves; U.S. Pat. No. 4,738,504 to Jones; U.S. Pat. No. 5,140,662 to Kumar; U.S. Pat. No. 5,317,664 to Grabiec et al.; U.S. Pat. No. 5,418,874 to Carlisle et al.; U.S. Pat. No. 5,455,880 to Reid et al.

Thus, a continuing need exists for strain relief fiber optic connectors.

SUMMARY

Accordingly an object of the present invention is to provide a strain relief connector for a fiber optic cable that has a relatively large frictional area between the inner surface of the crimp sleeve and the cover layer of the fiber optic cable for a strong reliable crimp connector.

Another object of the present invention is to provide a strain relief connector for a fiber optic cable that has a crimped configuration that allows for substantial lateral flow of the cover layer, putting substantially no longitudinal pressure or strain on the optical fiber.

Still another object of the present invention is to provide a strain relief connector for a fiber optic cable that has a crimp sleeve with a length that is long relative to the diameter of the cover layer, providing a large area of frictional engagement between the cover layer and crimp sleeve and the cover layer and optical fiber.

The foregoing objects are basically attained by providing-a strain relief connector, comprising a securing member, a fiber optic cable having an optical fiber with an outer surface enclosed within a cover having an inner surface and a first outer diameter, and a sleeve surrounding the fiber optic cable and coupled to the securing member. The sleeve has a first inner diameter. The first inner diameter is substantially larger than the first outer diameter. A die compressed crimp portion of the sleeve and a compressed portion of the fiber optic cable, have widths substantially larger than heights thereof. The inner surface of the cover frictionally engages the outer surface of the optical fiber disposed therein.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring to the drawings which form a part of this disclosure.

DETAILED DESCRIPTION OF THE PREFERRED EMBODIMENT

Figure 1:
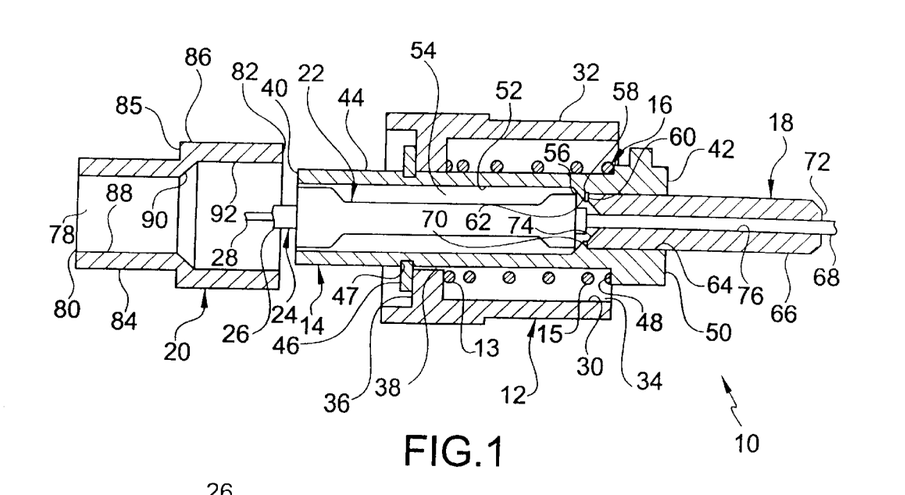
FIG. 1 is a side elevational view in section of a strain relief connector according to a first embodiment of the present invention.
Figure 2:
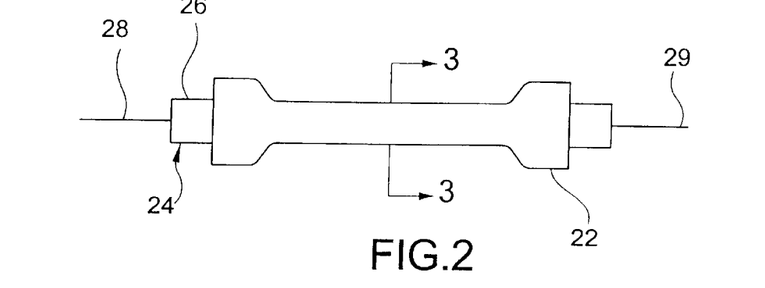
FIG. 2 is an enlarged side elevational view of the fiber optic cable extending through the crimp sleeve illustrated in FIG. 1, a portion of the fiber optic cable and the crimp sleeve being compressed.
Figure 3:
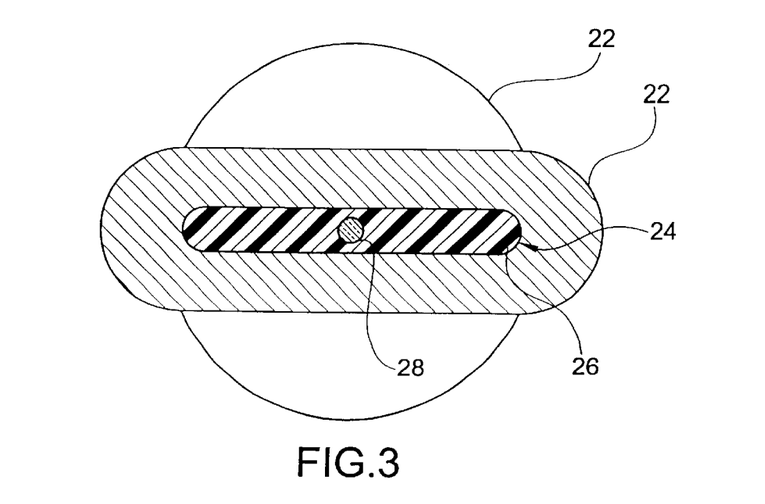
FIG. 3 is an end elevational view in section of the cable and sleeve taken along line 3—3 of FIG. 2.

Referring initially to FIGS. 1–3, a strain relief connector 10 according to a first embodiment of the present invention has a securing member or mechanism 12 surrounding a deformable connector body 14. Spring 16 is inserted between the securing member 12 and the connector body 14. The connector body 14 surrounds a portion of an alignment ferrule 18 and is coupled to a crimp ring 20. A deformable crimp tube or sleeve 22 is disposed within the connector body and the deformable crimp tube 22 is coupled to a fiber optic cable 24 having a cover 26 surrounding an optical fiber 28.

The securing member 12 is preferably a tubular or round metal threaded or bayonet type nut known in the pertinent art, such as an FC or ST type connector or any other suitable connector. The securing member does not necessarily have to be tubular, round, or metal and may be any type of securing device that can be connected to the deformable connector body 14 receiving deformable crimp tube 22.

Preferably, the securing member 12 has cylindrical inner and outer surfaces 30 and 32, respectively, the inner surface 30 defining a through passageway 34. Additionally, adjacent the inner surface 30 the securing member has a cylindrical shoulder or stop 36 defining a hole 38. Cylindrical shoulder 36 extends around the entire circumference of inner surface 30 and defines a reduced diameter for a portion of through passageway 34.

Deformable connector body 14 is preferably a metal tubular body having first and second ends 40 and 42, respectively. As seen in FIG. 1, adjacent first open end 40 is cylindrical outer surface 44. Outer surface 44 extends substantially the length of connector body 14. Extending substantially perpendicular to and away from surface 44 is cylindrical removable washer or stop 46. Stop 46 extends substantially around the circumference of outer surface 44 and fits into groove 47. Outer surface 44 terminates at outwardly extending, rearwardly axial facing surface 48 of extension 50. Extension 50 terminates at second open end 42, forming an enlarged radial portion of connector body 14.

Cylindrical inner surface 52 of connector body 14 defines through passageway 54 and is adjacent frustoconical surface 56. Frustoconical surface 56 tapers toward cylindrical surface 58, which is adjacent forwardly facing axial surface 60. Surfaces 56, 58 and 60 form a cylindrical shoulder or stop 62, which forms a reduced radius for a portion of through passageway 54. Adjacent surface 60 is cylindrical surface 64 that has substantially the same diameter as inner surface 52 and terminates at second end 42.

Spring 16 is preferably a helical plastic or metal spring having first and second ends 13 and 15, respectively. Spring 16 is not necessarily helical and may be any suitable shape or material that would be capable of biasing either the body 14 or the securing member 12, relative to the other.

As shown in FIG. 1, alignment ferrule 18 is preferably a ceramic cylindrical tube having outer surface 66 and through passageway 68. Alignment ferrule 18 does not necessarily have to be ceramic and may be any suitable material and shape that would allow it to be coupled to the connector body 14 or the securing member 12. Preferably, ferrule 18 has a first open end 70 and a second open end 72. Inner frustoconical surface 74 extends from first end 70, tapering inward toward the center of ferrule 18. Cylindrical surface 76 is adjacent surface 74 and extends to second end 72.

Crimp ring 20 is a preferably a metal cylindrical tube having through passageway 78 and first and second ends 80 and 82, respectively. However, ring 20 does not necessarily have to be metal and may be any suitable material and shape that would allow it to be coupled to the connector body 14. Cylindrical outer surface 84 extends from first open end 80 to one end of outwardly extending, rearwardly axially facing surface 85 and cylindrical surface 86 extends from the other end of surface 85 to second open end 82. Cylindrical inner surface 88 extends from first end 80 to frustoconical surface 90, which extends radially outwardly from surface 88 to cylindrical surface 92, surface 92 terminating at second end 82. Ring 20 facilitates coupling the connector body 14 to the sleeve 22.

Figure 4:
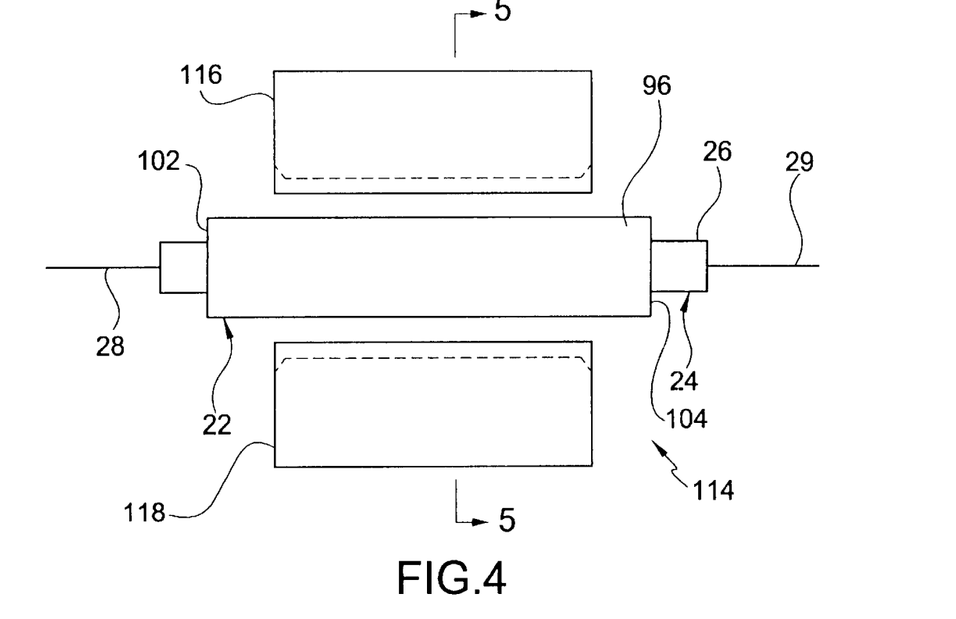
FIG. 4 is a side elevational view of a die and the fiber. optic cable extending through the crimp sleeve, illustrated in FIG. 2, prior to compression by the die.
Figure 5:
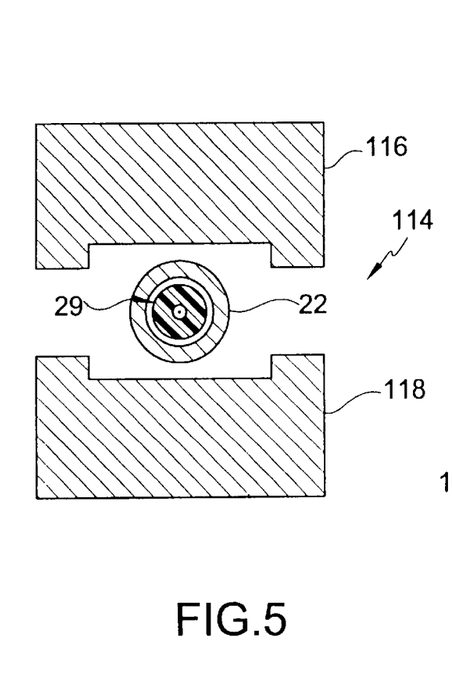
FIG. 5 is an end elevational view in section of the cable, sleeve and die taken along line 5—5 of FIG. 4.
Figure 6:
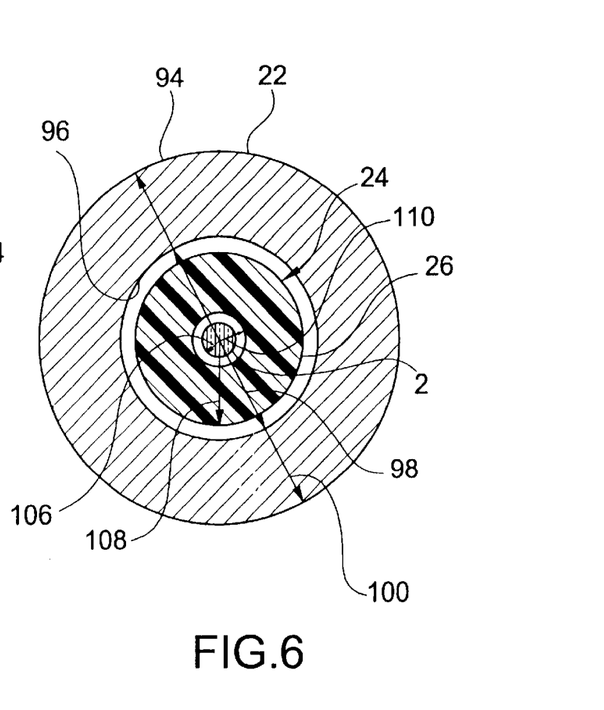
FIG. 6 is an enlarged end elevational view in section of the fiber optic cable disposed within the crimp sleeve of FIG. 5.
Figure 7A:
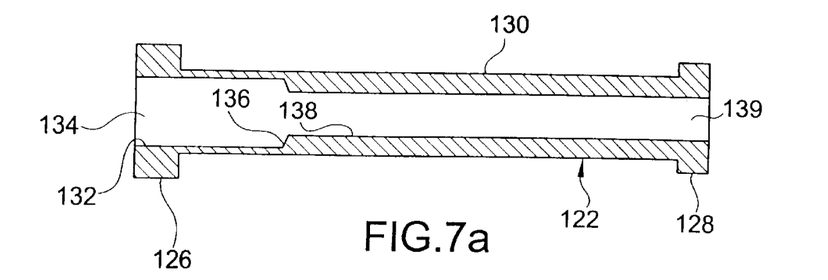
FIGS. 7a–d are side elevational views in section of a strain relief connector according to a second embodiment of the present invention having a fiber feed bushing inserted into the crimp sleeve.
Figure 7B:
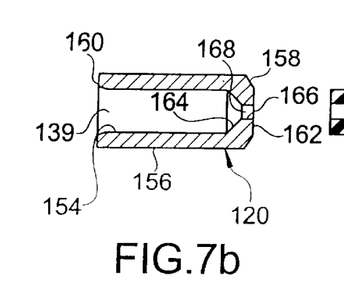
Figure 7C:
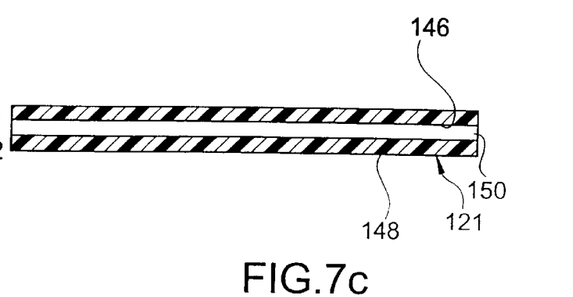
Figure 7D:
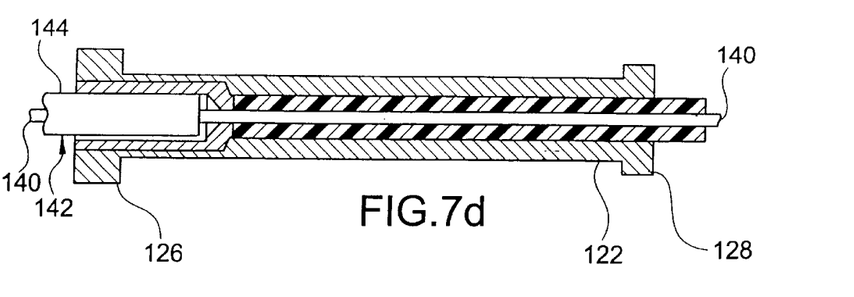

As seen in FIGS. 4–6, crimp sleeve 22 is preferably a relatively long deformable metal sleeve. The length of sleeve 22 is preferably at least five times the diameter of fiber optic cable 24 extending therethrough and is more preferably seven times the diameter of the cable 24. Crimp sleeve 22 has cylindrical inner and outer surfaces 94 and 96, respectively and initial inner and outer diameters, 98 and 100, respectively. The outer surface 96 is preferably a smooth substantially uniform surface extending from first open end 102 to second open end 104. Inner surface 94 may be either smooth or roughened to increase the coefficient of static friction thereon. As seen in FIGS. 1 and 2, a fiber optic cable 24 extends through the sleeve 22.

As seen in FIG. 6, the fiber optic cable preferably includes of a glass optical fiber 28 having a 125 micron (0.125 mm) outer diameter 106 surrounded by cover 26. However, the optical fiber may be any suitable diameter and any suitable material for propagating light, such as plastic or the like. The cover 26 is preferably a polymer tube formed from a thermoplastic elastomer material, such as HYTREL 6356. HYTREL forms a family of copolyester elastomers. Typical reactants from which the elastomers are derived are terephthalic acid, polytetramethylene glycol, and 1,4-butanediol. This type of elastomer is highly resilient with a good resistance to flex fatigue at low and high temperatures, and is resistant to oils and chemicals. However, the cover may be any suitable material that may be compressed while simultaneously protecting the optical fiber it surrounds. The cover 26 has a 900 micron initial outer diameter 108, which is substantially smaller than the inner diameter 98 of sleeve 22. Cover 26 surrounds optical fiber 28 and initial inner diameter 110 of cover 26 is substantially larger than the outer diameter of the optical fiber 28.

As seen in FIGS. 2 and 3, sleeve 22 and cable 24 are compressed along a portion thereof. The deformed width of the crimp sleeve is substantially greater than the original un-crimped outside diameter. The deformed height of the crimp sleeve is substantially less than the original un-crimped outside diameter. As seen specifically in FIG. 3, the internal portion of the present invention produces substantial vertical compression of cover 26 of optical fiber cable 24, the cover substantially filling the entire inner volume of the compressed crimp portion of sleeve. This vertical compression produces unique cross sectional geometries of the crimp sleeve 22 and cover 26, each having a width in the horizontal plane substantially greater than the height in the vertical plane.

Additionally, the volume of the deformed portion of the cover 26 is actually reduced from its original volume due to compression. The long length of the deformed portion of sleeve 22 is such that it constrains the flow of cover material in the axial direction due to friction with the internal surface of the crimp sleeve. Substantially all of the cover extends in a direction substantially perpendicular to the axial direction or a longitudinal axis of the optical fiber and the length of the sleeve, limiting tensile stress in the optical fiber in a longitudinal direction. This constraint of axial flow, in addition to the reduction in cover volume, produces increased local compression of cover material surrounding the glass fiber, as seen in FIG. 3. The lateral flow of cover 26 also limits the effect of axial cover elongation from inducing excessive tensile stress into the optical fiber 28 in the longitudinal direction. The combination of reduced volume and constrained flow of cover 26 results in an increase in the local density of the cover 26. The increase in local density results in an increase in the local elastic modulus of the material in contact with the optical fiber 28, which contributes to an increase in pressure applied to the surface of the optical fiber. This increase in applied pressure, over a relatively long length of area on the optical fiber, increases the friction force required to move the optical fiber in the axial direction relative to the deformed crimp sleeve. The increased friction force and subsequent resistance to axial movement of the optical fiber contributes to improved performance in tensile cable retention.

Additionally, the crimp may form a laterally central-portion (not shown) extending upwardly and downwardly from of sleeve 22 and cover 26 and, aligned vertically with the optical fiber, which are not compressed to the same extent as the remaining portions thereof. These central portions help maintain the centrality of the optical fiber 28 within the crimp sleeve 22 during the crimping process, and provide a slightly thicker region of cover 26 along both sides of the optical fiber in the vertical plane. These thicker, localized cover regions prevent the inner surface 96 of crimp sleeve 22 from contacting the glass fiber. This configuration adds an element of safety to the crimp technique described herein. It should be noted that any contact of metal to the optical fiber is undesirable, and could lead to fracture failure of the optical fiber.

To crimp sleeve 22 to cable 24, cable 24 is extended or inserted through sleeve 22. As seen in FIG. 4, sleeve 22 and cable 24 are then inserted into a long flat crimp die 114 having upper and lower jaws 116 and 118, respectively. As seen in FIG. 5, jaws 116 and 118 have a width that is substantially greater than the height thereof, permitting uninhibited lateral flow of sleeve 22 and cover 26. By applying the proper amount of pressure or designing the die 114 to be fully closed at the proper crimp height, the configuration of the die compressed crimp portion of the sleeve and the compressed portion of the fiber optic cable shown in FIG. 3 may be obtained.

Assembly

A portion of cover 26 is stripped away from the fiber optic cable 24, leaving an exposed portion 29 of optical fiber 28, as seen in FIGS. 2 and 4. As described above, cable 24 is inserted into sleeve 22 and crimped. Sleeve 22 and cable 24 are then inserted into connector body 14, as seen in FIG. 1. Securing member 12, connector body 14, and spring 16 are a preassembled conventional item that is known to one skilled in the art. Optical fiber 28 enters ferrule 18 and extending therethrough and sleeve 22 abuts stop 62. The exposed portion 29 of optical fiber 28 extends outward from alignment ferrule 18 after crimping to allow for cleaving and polishing flush to the end face. First end 40 of connector body 14 is then inserted into second open end 82 of ring 20 and coupled thereto by a conventional hex type crimp applied to surface 86. The hex crimp also coupling connector body 14 to sleeve 22, and further protecting sleeve 22 and fiber optic cable 24. However, it is possible to leave out one or a plurality of the above mentioned parts. For example, it is possible to couple the securing member 12 directly to the sleeve 22 using crimping or any other suitable methods, to connect the ferrule 18 directly to the sleeve 22 and/or to leave out the ring 20. In addition, it is possible to insert the fiber optic cable 26 directly into the connector body 14 and to crimp the connector body, as described below.

Embodiment of FIGS. 7a–d

As seen in FIGS. 7a–d, metal sleeve 122 is substantially similar to sleeve 22, however, sleeve 122 may have a fiber feed bushing 120 and elastomer tube or cover 121 inserted therein. Sleeve 122 also has cylindrical extensions 126 and 128 extending substantially perpendicular and outwardly from surface 130. Extensions 126 and 128 facilitate insertion and reception into connector body 14. In addition, sleeve 122 has a surface 132 defining a large through passageway 134. Surface 132 extends to frustoconical surface 136, which tapers inwardly and is adjacent cylindrical surface 138, which defines a small through passageway 139.

The bushing 120 has cylindrical inner and outer surfaces 154 and 156, respectively, inner surface 154 defining a through passageway 139. Outer surface 156 begins at first open end 160 extends to frustoconical surface 158, which terminates at second open end 162. Inner surface 154 extends from first end 160 to frustoconical surface 164, which is adjacent conical surface 166 defining through passageway 168.

The elastomer tube 121 is similar to cover 26 and surrounds a portion of an optical fiber or glass fiber 140, and has an inner and outer surface 146 and 148, inner surface 146 defining a through passageway 150. However, the cover 121 is a separate protective section and the fiber optic cable 142 has another cover or buffer portion 144 protecting the majority of the un-crimped or exposed portion of cable 142, a portion of which is stripped away allowing the optical fiber 140 to extend through passageway 150.

The elastomer tube 121 and feed bushing 120 are secured within the crimp tube by adhesive, interference fit, or staking or slight deformation of the crimp tube to permit a suitable interference fit. The buffer portion 144 of the optical fiber cable 142 is received within the through passage way 139 of the feed bushing 120, frustoconical surface 158 abutting frustoconical surface 136 of sleeve 122 when inserted therein. The exposed optical fiber 140 is received within the through passageway 168 of feed bushing 120 and throughout elastomer tube 121. Through passageway 168 of the feed bushing 120 is preferably larger than the optical fiber and slightly less than the internal diameter of elastomer tube 121. The optical fiber also extends outward from elastomer tube 121, to be received by the alignment ferrule of a typical connector or splice, similar to FIG. 1. Preferably, the long flat crimp is applied, as described above, over the crimp tube portion only through which elastomer tube 121 is received. However, the feed bushing 120 disposed within the crimp sleeve 122 may also be crimped.

Figure 8:
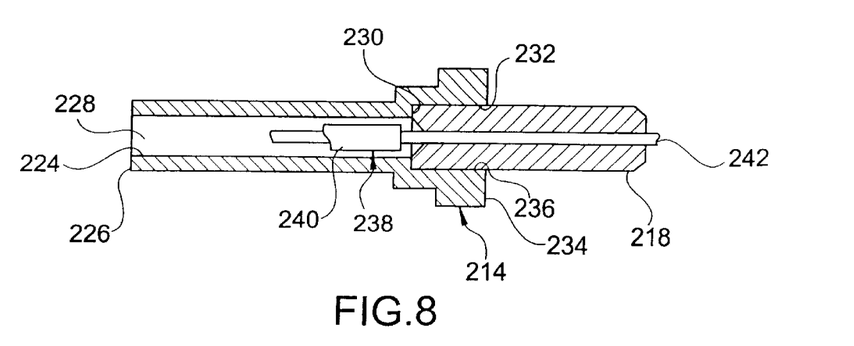
FIG. 8 is a side elevational view in section of a strain relief connector according to a third embodiment of the present invention, having an alignment ferrule inserted into the connector body.

Embodiment of FIG. 8

As seen in FIG. 8, metal connector body 214 has a plastic or metal alignment ferrule 218, inserted therein, as described above. Ferrule 218 is substantially similar to ferrule 18 and the description of ferrule 18 is applicable to ferrule 218. In the present embodiment, body 214 has an inner cylindrical surface 224 adjacent first open end 226 defining a through passageway 228 therethrough. Surface 224 is adjacent axially facing outwardly extending surface 230 that extends to cylindrical surface 232, which terminates at second open end 234. Surface 232 defining a through passageway 236 that is larger in diameter than through passageway 228.

Ferrule 218 may be inserted though second end 234 and one end of ferrule 218 abutting surface 230. In this configuration, the crimp, using a long flat crimp die similar to die 114 shown in FIGS. 4 and 5, is performed directly onto the connector body 214. Disposed within the connector body prior to crimping may be an fiber optic cable 238 either with the buffered layer or optical fiber surrounded by a thermoplastic elastomer tube 240, as described above. The elastomer tube 240 configuration may have a fiber feed bushing as described above, to aid the insertion of optical fiber 242 into the elastomer tube 240.

Figure 9:
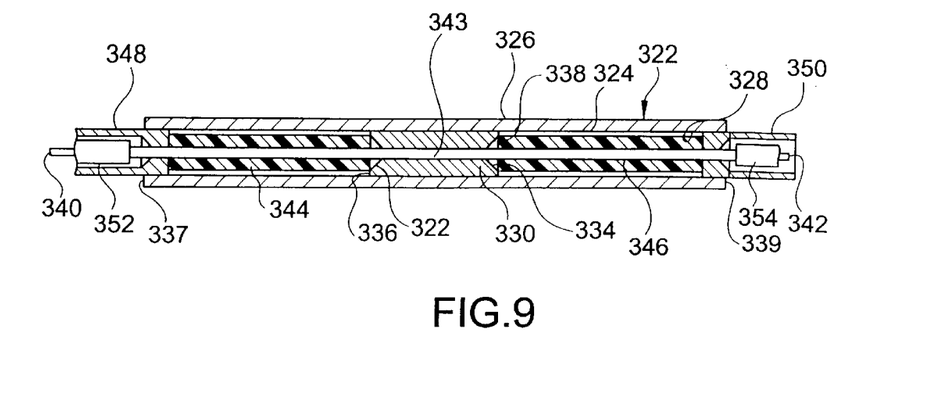
FIG. 9 is a side elevational view in section of a strain relief connector according to a fourth embodiment of the present invention having an alignment ferrule inside a crimp sleeve to align separate fiber optic cables.
Figure 10:
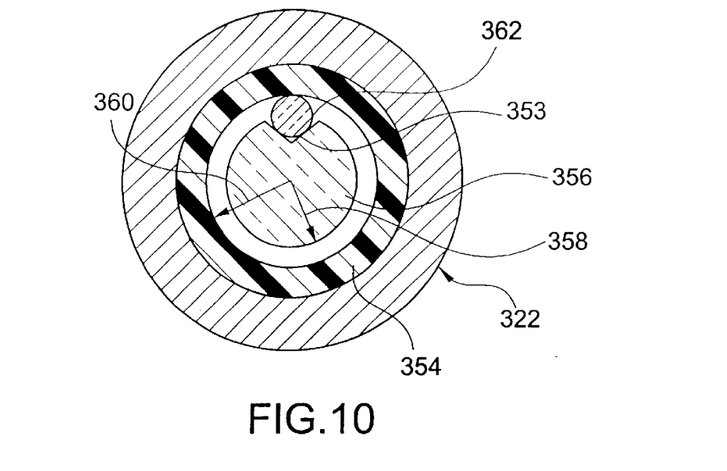
FIG. 10 is an end elevational view in section of a strain relief connector according to a fifth embodiment of the present invention having a V-groove element to align separate fiber optic cables.

Embodiment of FIG. 9 and 10

As seen in FIG. 9, the crimp method described above may be used to splice two axially aligned separate fiber optic cables together. A metal crimp sleeve 322 has inner and outer surfaces 324 and 326, surface 324 defining a uniform through passageway 328. A metal or plastic fiber alignment ferrule 330, similar to the alignment ferrules described above, however, having a inner frustocontical surfaces 332 and 334 on each open end 336 and 338, respectively, is positioned substantially equidistant from first and second ends 337 and 339 of sleeve 322, as shown in FIG. 9. Frustoconical surfaces 332 and 334 facilitate entering of optical fibers or exposed optical fibers 340 and 342 into each respective end of ferrule 318. Optical fibers 340 and 342 extend from respective fiber optic cables in a manner described above. The two optical fibers join together in physical contact or abut one another within the alignment ferrule at a point 343. The alignment ferrule may have optical refractive index matching gel to enhance optical transmission therethrough.

Disposed within each end of the deformable crimp tube 322 are thermoplastic elastomer tubes 344 and 346. The elastomer tubes are substantially similar to the elastomer tubes described above, and surround exposed optical fibers 340 and 342, onto which the long flat crimp is applied, in a similar manner as described above. The covers 352 and 354 of the fiber cables are not necessarily crimped in this embodiment. To aid the insertion of the fibers 340 and 342 through the elastomer tubes 344 and 346, fiber feed bushings 348 and 350 may be used by securing into the ends of the deformable crimp tube 322, as described above. Fiber feed bushings 348 and 350 are substantially similar to the feed bushings described above.

It is also possible to center the two optical fibers along a vertical axis, using a V-groove 353 in a non-deformable cylindrical member 356, as shown in FIG. 10. Cylinder member 356 is disposed within sleeve 322 similarly to ferrule 330, shown in FIG. 9 and functions in a substantially similar manner as ferrule 330, optic fibers contacting one another along a length of groove 353. Only one optical fiber 362 is shown, as it is understood that member 356 may splice two or more fiber optic cables together as described above. Preferably, cylindrical member 356 is formed from glass, although it can also be plastic or metal, and has an outer diameter 358 that is substantially smaller then the inner diameter 360 of the elastomer tube 354. Applied in the vertical plane, the flat crimp dies deform the crimp tube, thereby compressing the elastomer 354 over the adjoined optical fibers, forcing them into the V-groove 352. This force on the fibers in the groove produces a frictional force that resists axial movement or slippage of the fibers apart from each other. It is understood that the deformable crimp tube, elastomer, and V-groove element may be of circular or noncircular shape, or any shape permitting the use of a long flat crimp. The two exposed glass fibers join together in physical contact within the V-groove, where refractive index matching gel may be applied to enhance optical transmission therethrough.

Figure 11:
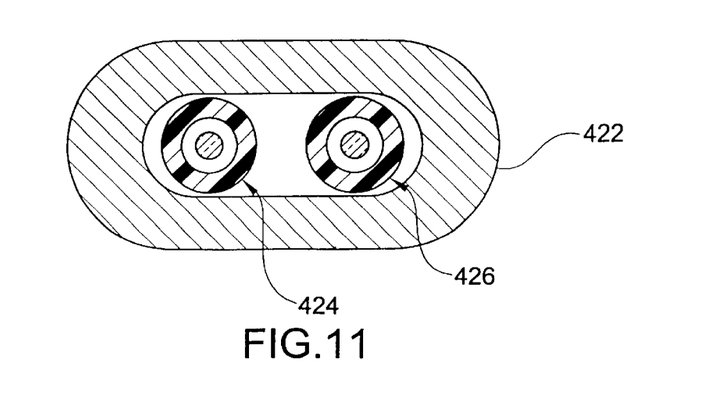
FIG. 11 is an end elevational view in section of a strain relief connector according to a sixth embodiment of the present invention having a plurality of fiber optic cables extending through a crimp sleeve prior to compression.
Figure 12:
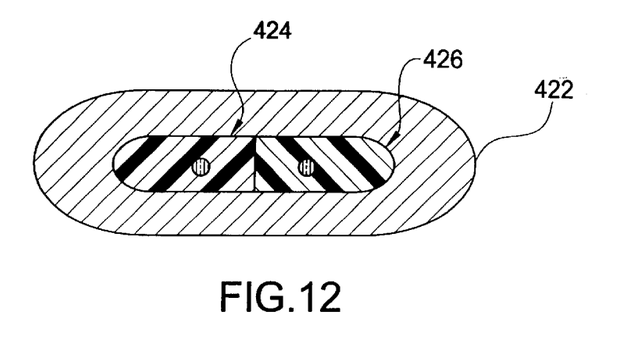
FIG. 12 is an end elevational view in section of the strain relief connector of FIG. 11 after being compressed by a die.
Figure 13:
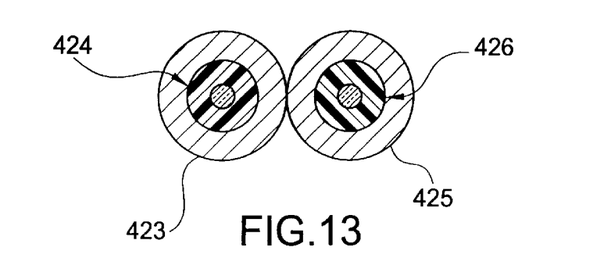
FIG. 13 is an end elevational view in section of a strain relief connector according to a seventh embodiment of the present invention having a plurality of fiber optic cables extending in separate or connected crimp sleeves.

Embodiment of FIGS. 11–13

As seen in FIG. 11, sleeve 422, is initially oval in shape, in all other aspects, material and length, of sleeve 422 is substantially similar to sleeve 22. Extending through sleeve 422 are fiber optic cables 424 and 426, Cables 424 and 426 are substantially similar to cable 24, described above. It is understood that this configuration may apply to one, two, or more optical fibers disposed within either a single round or oval, or multiple round 423 and 425, as shown in FIG. 13, or oval tubes, either adjacent to one another or with spacing between.

FIG. 12 shows the crimped condition of the duplex fiber configuration, shown in FIG. 11. The internal diameter of the elastomer tube collapses in a manner to surround the optical fiber. The pressure of the elastomer surrounding the optical fiber is such that the retention strength of the fiber within the crimp will exceed prior art strain relief connectors. The crimping and assembly methods are substantially similar to those described above.

Embodiment of FIG. 14–17

Figure 14:
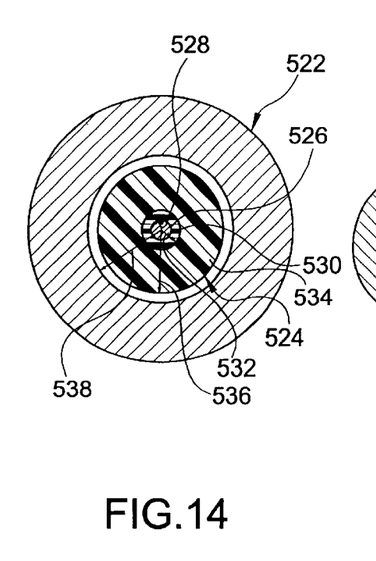
FIG. 14 is an end elevational view in section of a strain relief connector according to an eighth embodiment of the present invention having a fiber optic cable with a coating material and a buffer layer extending through a crimp sleeve, before being compressed.

Crimp sleeve 522 is substantially similar to sleeve 22 described above. However, as shown in FIG. 14, the fiber optic cable 524 has an optical fiber 526 of a 125 micron (0.125 mm) diameter 528. Surrounding the optical fiber is preferably an acrylate polymer coating 530 that has of a 250 micron (0.250 mm) outside diameter 532. However, the coating may be any suitable polymer. Surrounding the polymer coating 530 is a buffer material or layer 534 of a 900 micron (900 mm) outer diameter 536. Preferably the buffer layer is polyvinyl chloride (PVC), but may be any other suitable material. Similar the cover 26 above, outer diameter 536 of buffer layer 534 is substantially smaller than inner diameter 538 of sleeve 522.

Figure 15:
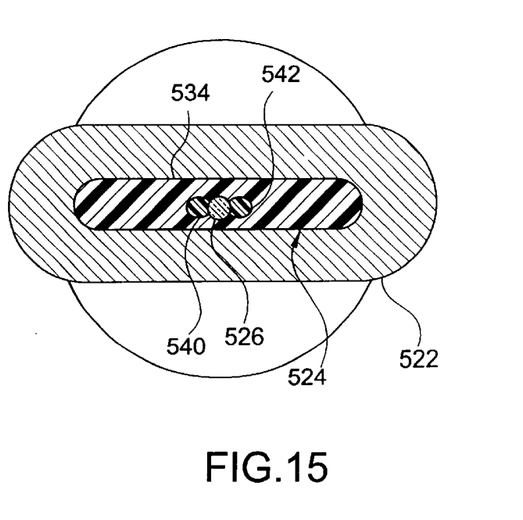
FIG. 15 is an end elevational view in section of the strain relief connector of FIG. 14 after being compressed by a die.

The crimping method is substantially similar to the above described crimping method and results in the deformed width substantially greater than the deformed height. As seen in FIG. 15, the internal portion of the present embodiment produces substantial vertical compression of the buffer layer and coating of the optical fiber cable. This vertical compression imparted by the flat crimp die profile produces unique cross sectional geometries of the crimp sleeve 522, buffer layer 534, and coating material 530. The unique pattern of coating material displacement is such that the coating material flows in a divergent pattern relative to the glass optical fiber, the coating material substantially filling the entire inner volume of the compressed crimp portion of sleeve. The divergent pattern of the coating material 530 is such that two circular-segmented lobes 540 and 542 of bilateral symmetry are formed adjacent to the optical fiber in the horizontal plane, as seen in FIG. 15. The formation of the divergent, circular-segmented lobes 540 and 542 of coating material 530 permits the compressed buffer layer 534 to contact the optical fiber 526 along two separated arcute areas on opposite sides of the glass fiber. This change in material contact can only be accomplished by the flat crimp technique. The amount of divergence of the coating material in the horizontal direction is dependent on the rigidity of the buffer layer. Buffer materials of relatively high rigidity produce less horizontal divergence of the coating material.

According to calculations, the volume within the internal deformed portion of the buffer layer and coating material is actually reduced. For example, the percent reduction in aggregate volume of the buffer layer and coating material can be as much as 8%. The long length (as defined herein) of the deformed portion of this preferred embodiment is such that it constrains the flow of buffer material in the axial direction due to friction against the internal surface of the crimp sleeve. A drilled finish on the internal diameter of the undeformed crimp sleeve enhances this friction effect. This constraint of axial flow, in addition to the aggregate reduction in buffer layer and coating material volumes, produces increased local compression of buffer layer and coating material surrounding the glass fiber in FIG. 15. Similar to the cover 26, described above, the combination of reduced volume and constrained flow of buffer layer and coating material results in an increase in the local density of the aggregate buffer layer and coating material and an increased friction force. The increased friction force and subsequent resistance to axial movement of the optical fiber contributes to improved performance in tensile cable retention tests.

Additionally similar to that described above, a portion of the internal radius of the crimp sleeve and a portion of the buffer layer in the crimped portion may remain slightly undeformed. These portions of the internal radius and buffer layer helps maintain the centrality of the optical fiber and prevent the deformed metal crimp sleeve internal surface from contacting the glass fiber.

Figure 16:
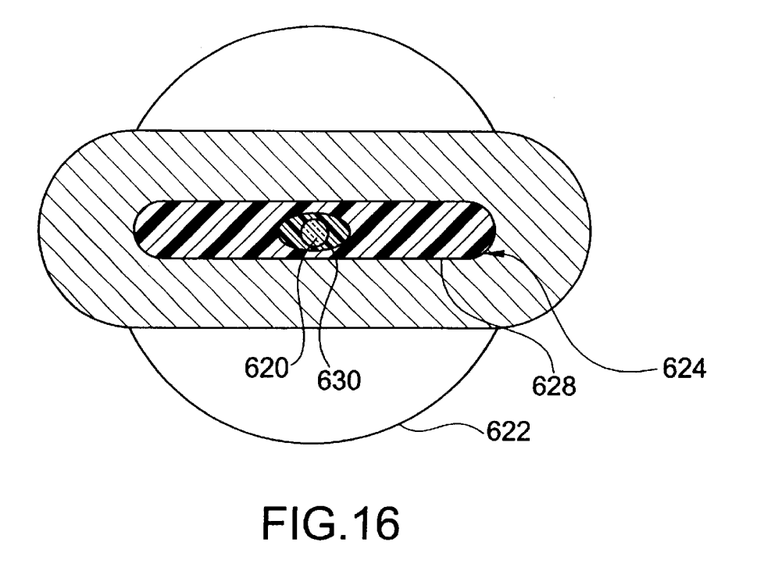
FIG. 16 is an end elevational view in section of the strain relief connector of FIG. 14, wherein less force was used to compress the crimp sleeve then used in the connector of FIG. 15.

FIG. 16 illustrates a further embodiment of fiber optic cable 624 and a sleeve 622. The cable 624 has an optical fiber 626 surrounded by a coating material 630, which is surrounded by a buffer layer 628 after crimping. In this embodiment, the deformed height is somewhat greater than as shown in FIG. 15, the displacement of the coating material 630 is less severe, due to the height of the crimp die, the amount of pressure exerted or the strength of the buffer layer. This deformation results in the coating material remaining in contact around the entire diameter of the glass optical fiber. The sleeve 622 and the methods of assembly and crimping are substantially similar to those above.

Figure 17:
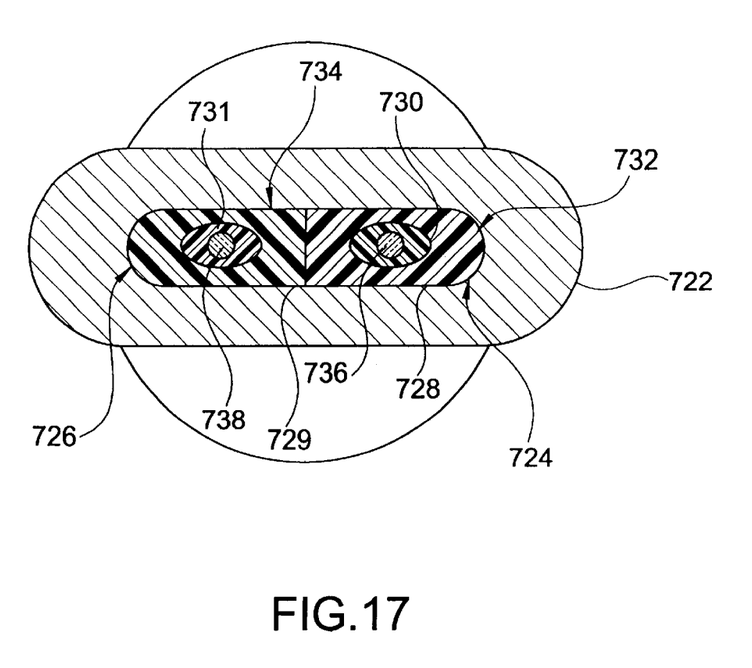
FIG. 17 is an end elevational view in section of the strain relief connector of FIG. 14, but with plurality of fiber optic cables extending through a crimp sleeve.

As seen in FIG. 17, a plurality fiber optic cables 724 and 726 extend through sleeve 722. The buffer layers 728 and 729 of each fiber optic cable 732 and 734 flows in a manner which completely fills the oval shaped internal area of the crimp sleeve after crimping. The coating material 730 and 731 of each optical fiber 736 and 738 may deform into a pattern similar to that shown in FIG. 16, or in FIG. 15 The materials and method of crimping are similar to those described above.

While specific embodiments have been chosen to illustrate the invention, it will be understood by those skilled in the art that various changes and modifications can be made therein without departing from the scope of the invention as defined in the appended claims.

What is claimed is:

1. A strain relief connector, comprising:
   a first fiber optic cable having a first optical fiber with a first outer surface enclosed within a cover, said cover having a first inner surface and a first outer diameter;
   a sleeve surrounding said first fiber optic cable, said sleeve having a first inner diameter, said first inner diameter being substantially larger than said first outer diameter; and
   a die compressed crimp portion of said sleeve and a compressed portion of said first fiber optic cable having widths substantially larger than heights thereof, said first inner surface of said cover frictionally engaging said first outer surface of said first optical fiber disposed therein, said die compressed crimp portion of said sleeve defining an inner volume and said cover filing substantially all of said inner volume.

2. A strain relief connector according to claim 1 wherein said sleeve has a second inner surface frictionally engaging a second outer surface of said cover disposed therein.

3. A strain relief connector according to claim 1 wherein said cover is a polymer tube.

4. A strain relief connector according to claim 3, wherein said polymer tube is formed from a thermoplastic material.

5. A strain relief connector according to claim 4, wherein said thermoplastic material is a copolyester elastomer.

6. A strain relief connector according to claim 3, wherein said first optical fiber has an outer diameter; said polymer tube has a second inner diameter; and said second inner diameter is substantially larger than said outer diameter of said first optical fiber.

7. A strain relief connector according to claim 1 wherein said sleeve is a non-resilient deformable metal sleeve and has a length at least five times said first outer diameter.

8. A strain relief connector according to claim 7 wherein substantially all of said cover extends in a direction substantially perpendicular to said length of said sleeve in said compressed portion of said first fiber optic cable.

9. A strain relief connector according to claim 1 wherein substantially all of said cover extends in a direction substantially perpendicular to a longitudinal axis of said first optical fiber in said compressed portion of said first fiber optic cable, limiting tensile stress in said first optical fiber in a longitudinal direction.

10. A strain relief connector according to claim 1 wherein a portion of the said cover remains undeformed in said compressed portion of said first fiber optic cable.

11. A strain relief connector according to claim 1 wherein said inner surface of said sleeve has a roughened finish.

12. A strain relief connector according to claim 1 wherein said cover is a coating material surrounded by a buffer layer.

13. A strain relief connector according to claim 12 wherein said coating material is formed from an acrylate polymer.

14. A strain relief connector according to claim 12 wherein said coating material comprises two lobes adjacent said first optical fiber in said compressed portion of said first fiber optic cable.

15. A strain relief connector according to claim 12 wherein said coating material has a reduced volume in said compressed portion of said first fiber optic cable relative to a portion thereof outside of said compressed portion.

16. A strain relief connector according to claim 15 wherein said buffer layer has a reduced volume in said compressed portion of said first fiber optic cable relative to a portion thereof outside of said compressed portion.

17. A strain relief connector according to claim 16 wherein said buffer layer and said coating material have reduced volumes in aggregate approximately 8 percent in said compressed portion of said first fiber optic cable relative to a portion thereof outside of said compressed portion.

18. A strain relief connector according to claim 1 wherein said sleeve is coupled to a securing member.

19. A strain relief connector according to claim 1 wherein said sleeve surrounds a second fiber optic cable having a second optical fiber, said first optical fiber abutting said second optical fiber.

20. A strain relief connector, comprising:

a securing member;

at least one fiber optic cable having a cylindrical optical fiber with a first outer surface enclosed within a cover having a first inner surface and a second outer surface and an outer diameter;

a non-resilient deformable metal sleeve surrounding said at least one fiber optic cable and coupled to said securing member, said deformable metal sleeve having an second inner surface, an inner diameter, and a length at least five times said inner diameter, said inner diameter being substantially larger than said outer diameter of said cover; and a die compressed crimp portion of said sleeve and a compressed portion of said at least one fiber optic cable having widths substantially larger than heights thereof, said second inner surface of said sleeve frictionally engaging said second outer surface of said cover disposed therein and said first inner surface of said cover frictionally engaging said first outer surface of said optical fiber;

wherein, said cover is a continuous elastomeric material between said fiber optic cable and said sleeve, and substantially all of said cover extends in a direction substantially perpendicular to said length of said sleeve in said compressed portion of said fiber optic cables.

21. A strain relief connector according to claim 20 wherein said deformable metal sleeve surrounds a plurality of fiber optic cables.

22. A method of forming a strain relief connector, the method comprising the steps of extending at least one fiber optic cable through a deformable metal sleeve, the at least one fiber optic cable having an optical fiber with a first outer surface enclosed within a cover having a first inner surface and a second outer surface and an outer diameter, and the sleeve having a second inner surface and an inner diameter, the inner diameter being larger than the outer diameter and defining a gap therebetween, compressing a portion of the deformable metal sleeve and a portion of the fiber optic cable in the sleeve with a die, forming a die compressed crimp portion of the deformable metal sleeve and a compressed portion of the fiber optic cable having widths substantially larger than heights thereof, the first inner surface of the cover frictionally engaging the first outer surface of a portion of the optical fiber disposed therein, the die compressed portion of the deformable metal sleeve being compressed to define an inner volume such that the cover substantially fills all of the inner volume of the compressed portion of the deformable metal sleeve, and coupling the deformable metal sleeve to a securing member.

23. A method according to claim 22 wherein the second inner surface of the sleeve frictionally engages the second outer surface of a portion of the cover.

24. A method according to claim 22 wherein the compressing step includes deforming the portion of the cover disposed in the compressed portion such that substantially all of the cover flows in a direction substantially perpendicular to a length of the sleeve.

25. A method according to claim 22 wherein the cover is a polymer tube.

26. A method according to claim 25 wherein the polymer tube is formed from a thermoplastic material.

27. A method according to claim 26 wherein the thermoplastic material is a copolyester elastomer.

28. A method according to claim 22 wherein the cover is a coating material formed from an acrylate polymer surrounded by a buffer layer.

29. A method according to claim 28 wherein the compressing step includes displacing a portion of the coating material, forming two portions of bilateral symmetry adjacent the optical fiber.

30. A method according to claim 28 wherein the compressing step includes compressing a portion of the coating material, reducing the volume of the portion of the coating material.

31. A method to claim 30 wherein the compressing step includes compressing a portion of said buffer layer, reducing the volume of the portion of the buffer layer.

32. A method according to claim 31 wherein the compressing step includes compressing a portion of said buffer layer a portion of the said buffer layer remains undeformed in said compressed portion of said fiber optic cable.

* * * * *